(12) United States Patent
Zakharchenko et al.

(10) Patent No.: US 11,336,892 B2
(45) Date of Patent: May 17, 2022

(54) ADAPTIVE MULTI-HYPOTHESIS CONTEXT-ADAPTIVE BINARY ARITHMETIC CODING (MCABAC)

(71) Applicant: Huawei Technologies Co., Ltd., Shenzhen (CN)

(72) Inventors: Vladyslav Zakharchenko, Sunnyvale, CA (US); Jianle Chen, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/923,908

(22) Filed: Jul. 8, 2020

(65) Prior Publication Data

US 2020/0344480 A1 Oct. 29, 2020

Related U.S. Application Data

(63) Continuation of application No. PCT/US2019/013037, filed on Jan. 10, 2019.

(60) Provisional application No. 62/617,049, filed on Jan. 12, 2018.

(51) Int. Cl.
| | | |
|---|---|---|
| *H04N 7/18* | (2006.01) | |
| *H04N 19/13* | (2014.01) | |
| *H04N 19/18* | (2014.01) | |
| *H04N 19/184* | (2014.01) | |
| *H04N 19/46* | (2014.01) | |
| *G06F 17/18* | (2006.01) | |

(52) U.S. Cl.
CPC ............. *H04N 19/13* (2014.11); *G06F 17/18* (2013.01); *H04N 19/18* (2014.11); *H04N 19/184* (2014.11); *H04N 19/46* (2014.11)

(58) Field of Classification Search
CPC ...... H04N 19/13; H04N 19/18; H04N 19/184; H04N 19/46; G06F 17/18
USPC ...................................................... 375/240.16
See application file for complete search history.

(56) References Cited

U.S. PATENT DOCUMENTS

| | | |
|---|---|---|
| 6,856,701 B2 | 2/2005 | Karczewicz et al. |
| 7,932,843 B2 | 4/2011 | Demircin et al. |
| 2014/0064360 A1* | 3/2014 | Rapaka ................. H04N 19/30 375/240.02 |
| 2014/0177708 A1* | 6/2014 | Alshin ................. H03M 7/4006 375/240.12 |
| 2016/0353110 A1* | 12/2016 | Zhang .................. H04N 19/174 |
| 2017/0105013 A1* | 4/2017 | Fairhurst .............. H04N 19/126 |
| 2018/0070100 A1* | 3/2018 | Chen ..................... H04N 19/13 |
| 2019/0068970 A1* | 2/2019 | He ......................... H04N 19/91 |
| 2019/0230350 A1* | 7/2019 | Chen .................... H04N 19/573 |

(Continued)

OTHER PUBLICATIONS

Alshin et al, High Precision Probability Estimation for CABAC (Year: 2013).*

(Continued)

*Primary Examiner* — Shan E Elahi
(74) *Attorney, Agent, or Firm* — Conley Rose, P.C.

(57) ABSTRACT

A method comprises obtaining a first weight for a first probability associated with a first probability update window; obtaining a second weight for a second probability associated with a second probability update window, wherein the first weight and the second weight are unequal; and coding, using the first weight and the second weight, a portion of a video.

26 Claims, 5 Drawing Sheets

(56) References Cited

U.S. PATENT DOCUMENTS

2020/0344480 A1* 10/2020 Zakharchenko ..... H04N 19/184

OTHER PUBLICATIONS

Alshin, A et al., Coding efficiency improvements beyond HEVC with known tools (Year: 2015).*
Chen, J., et al., "Algorithm Description of Joint Exploration Test Model 7 (JEM 7)," JVET-G1001-v1, 7th Meeting TOrino, IT, Jul. 13-21, 2017, 50 pages.
"Series H: Audiovisual and Multimedia Systems, Infastructure of audiovisual services—Coding of moving video, High efficiency video calling," ITU-T, H.265, Dec. 2016, 664 pages.
Marpe, D., "Context-Based Adaptive Binary Arithmetic Coding in the H.264/AVC Video Compression Standard," IEEE Transactions on Circuits and Systems for Video Technology, vol. 13, No. 7, Jul. 2003, pp. 620-636.
Sullivan, G., et al., "Overview of the High Efficiency Video Coding (HEVC) Standard," IEEE Transactions on Circuits and Systems for Video Technology, vol. 22, No. 12, Dec. 2012, pp. 1649-1668.
Bross, B., et al., "Versatile Video Coding (Draft 3)," JVET-L1001v5, 12th Meeting: Macao, CN, Oct. 3-12, 2018, 194 pages.
Alshin, A., et al., "High precision probability estimation for CABAC," Visual Communications and Image Processing, XP032543605, Nov. 17, 2013, 6 pages.

* cited by examiner

ADAPTIVE MULTI-HYPOTHESIS CONTEXT-ADAPTIVE BINARY ARITHMETIC CODING (MCABAC)

CROSS-REFERENCE TO RELATED APPLICATIONS

This is a continuation of Int'l Patent App. No. PCT/US2019/013037 filed on Jan. 10, 2019 by Futurewei Technologies, Inc. and titled "Adaptive Multi-Hypothesis Context-Adaptive Binary Arithmetic Coding (MCABAC)," which claims priority to U.S. Prov. Patent App. No. 62/617,049 filed on Jan. 12, 2018 by Futurewei Technologies, Inc. and titled "Adaptive Multi-Hypothesis Context-Adaptive Binary Arithmetic Coding (MCABAC)," both of which are incorporated by reference.

TECHNICAL FIELD

The disclosed embodiments relate to video coding in general and MCABAC in particular.

BACKGROUND

Videos use a relatively large amount of data, so communication of videos uses a relatively large amount of bandwidth. However, many networks operate at or near their bandwidth capacities. In addition, customers demand high video quality, which requires using even more data. There is therefore a desire to both reduce the amount of data videos use and improve video quality. One solution is to compress videos during an encoding process and decompress the videos during a decoding process.

SUMMARY

A first aspect relates to a method comprising obtaining a first weight for a first probability associated with a first probability update window; obtaining a second weight for a second probability associated with a second probability update window, wherein the first weight and the second weight are unequal; and coding, using the first weight and the second weight, a portion of a video. The method provides for the ability to model bin strings with more emphasis on $P_0^{new}$ or on $P_1^{new}$.

In a first implementation form of the method according to the first aspect as such, an overall probability is based on the first weight, the first probability, the second weight, and the second probability.

In a second implementation form of the method according to the first aspect as such or any preceding implementation form of the first aspect, the overall probability is equal to 1.

In a third implementation form of the method according to the first aspect as such or any preceding implementation form of the first aspect, the first weight is $\alpha_0$, the first probability is $P_0^{new}$, the second weight is $\alpha_1$, and the second probability is $P_1^{new}$ and wherein $P=\alpha_0 P_0^{new}+\alpha_1 P_1^{new}$.

In a fourth implementation form of the method according to the first aspect as such or any preceding implementation form of the first aspect, the first probability update window is shorter than the second probability update window and used for quickly-changing data, and wherein the second probability update window is used for slowly-changing data.

In a fifth implementation form of the method according to the first aspect as such or any preceding implementation form of the first aspect, at least one of the first weight or the second weight is predefined.

In a sixth implementation form of the method according to the first aspect as such or any preceding implementation form of the first aspect, a sum of the first weight and the second weight is 1.

In a seventh implementation form of the method according to the first aspect as such or any preceding implementation form of the first aspect, the coding is encoding.

In an eighth implementation form of the method according to the first aspect as such or any preceding implementation form of the first aspect, the method further comprises signaling at least one of the first weight or the second weight in a bitstream.

In a ninth implementation form of the method according to the first aspect as such or any preceding implementation form of the first aspect, the signaling is based on an equal distribution.

In a tenth implementation form of the method according to the first aspect as such or any preceding implementation form of the first aspect, the signaling is based on an unequal distribution.

In an eleventh implementation form of the method according to the first aspect as such or any preceding implementation form of the first aspect, the signaling is in a sequence parameter set.

In a twelfth implementation form of the method according to the first aspect as such or any preceding implementation form of the first aspect, wherein the signaling is in a picture parameter set.

In a thirteenth implementation form of the method according to the first aspect as such or any preceding implementation form of the first aspect, the method further comprises deriving at least one of the first weight and the second weight.

In a fourteenth implementation form of the method according to the first aspect as such or any preceding implementation form of the first aspect, the deriving is based on a first counter for the first probability, a second counter for the second probability, and a comparison of the first counter and the second counter.

In a fifteenth implementation form of the method according to the first aspect as such or any preceding implementation form of the first aspect, the coding is decoding.

In a sixteenth implementation form of the method according to the first aspect as such or any preceding implementation form of the first aspect, the method further comprises receiving a code indicating at least one of the first weight or the second weight in a bitstream.

In a seventeenth implementation form of the method according to the first aspect as such or any preceding implementation form of the first aspect, the code is based on an equal distribution.

In an eighteenth implementation form of the method according to the first aspect as such or any preceding implementation form of the first aspect, the code is based on an unequal distribution.

In a nineteenth implementation form of the method according to the first aspect as such or any preceding implementation form of the first aspect, the code is in a sequence parameter set.

In a twentieth implementation form of the method according to the first aspect as such or any preceding implementation form of the first aspect, the code is in a picture parameter set.

In a twenty-first implementation form of the method according to the first aspect as such or any preceding implementation form of the first aspect, the method further comprises deriving at least one of the first weight and the second weight.

In a twenty-second implementation form of the method according to the first aspect as such or any preceding implementation form of the first aspect, the deriving is based on a first counter for the first probability, a second counter for the second probability, and a comparison of the first counter and the second counter.

A second aspect relates to an apparatus comprising a memory; and a processor coupled to the memory and configured to perform any of the first aspect as such or any preceding implementation form of the first aspect.

A third aspect relates to a computer program product comprising computer-executable instructions stored on a non-transitory medium that when executed by a processor cause an apparatus to perform any of the first aspect as such or any preceding implementation form of the first aspect.

Embodiments can be implemented in hardware, software, or in any combination of hardware and software.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations apply:
ASIC: application-specific integrated circuit
CABAC: context-adaptive binary arithmetic coding
CPU: central processing unit
CU: coding unit
DSP: digital signal processor
EO: electrical-to-optical
FPGA: field-programmable gate array
GOP: group of pictures
LPS: least probable symbol
MCABAC: multi-hypothesis CABAC
MVD: motion vector difference
NAL: network abstraction layer
OE: optical-to-electrical
PPS: picture parameter set
RAM: random-access memory
RF: radio frequency
ROM: read-only memory
RX: receiver unit
SPS: sequence parameter set
SRAM: static RAM
TCAM: ternary content-addressable memory
TX: transmitter unit.

Figure 1:
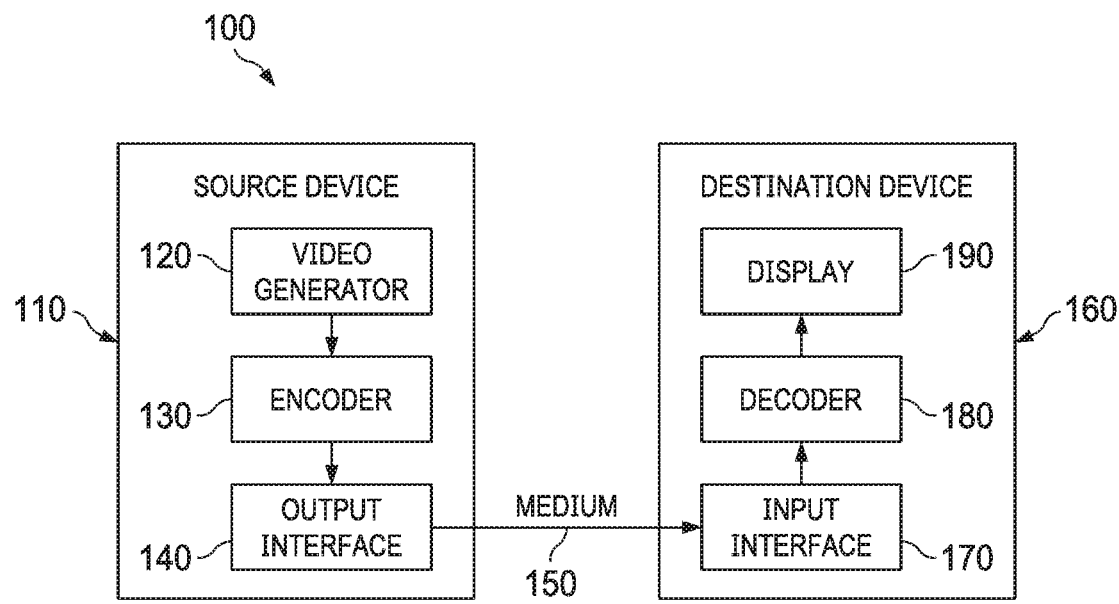
FIG. 1 is a schematic diagram of a coding system.

FIG. 1 is a schematic diagram of a coding system 100. The coding system 100 comprises a source device 110, a medium 150, and a destination device 160. The source device 110 and the destination device 160 are mobile phones, tablet computers, desktop computers, notebook computers, or other devices. The medium 150 is a local network, a radio network, the Internet, or another communications medium.

The source device 110 comprises a video generator 120, an encoder 130, and an output interface 140. The video generator 120 is a camera or another device that generates videos. The encoder 130 may be referred to as a codec. The encoder 130 encodes the videos and other data into bitstreams according to a set of rules. The output interface 140 is an antenna or another component that transmits the bitstreams to the destination device 160. Alternatively, the video generator 120, the encoder 130, and the output interface 140 are in a combination of devices.

The destination device 160 comprises an input interface 170, a decoder 180, and a display 190. The input interface 170 is an antenna or another component that receives the bitstreams from the source device 110. The decoder 180 may also be referred to as a codec. The decoder 180 decodes the videos and other data from the bitstreams according to the set of rules. Together, encoding and decoding are referred to as coding. The display 190 displays the videos for a user to view. Alternatively, the input interface 170, the decoder 180, and the display 190 are in a combination of devices.

The encoder 130 may encode videos using lossless coding to obtain encoded videos. Lossless coding is coding that allows the decoder 180 to then perfectly decode the encoded videos to obtain the original videos. One type of lossless coding is entropy coding, which represents frequently-occurring patterns with relatively fewer bits and rarely-occurring patterns with relatively more bits. CABAC is a type of entropy coding based on arithmetic coding.

Figure 2:
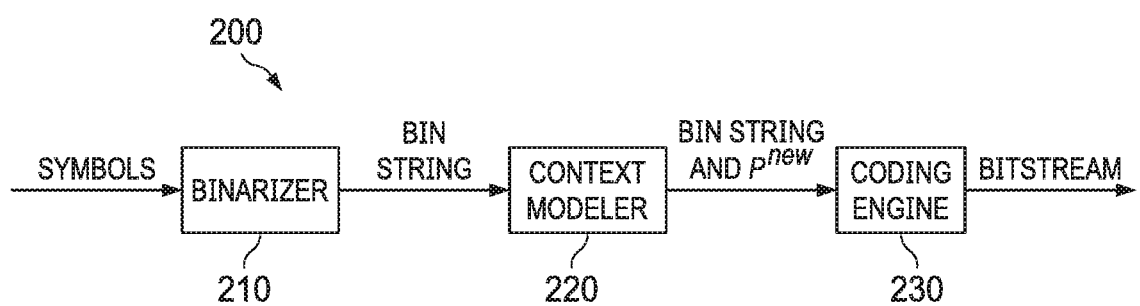
FIG. 2 is a block diagram of a simplified CABAC encoder.

FIG. 2 is a block diagram of a simplified CABAC encoder 200. The simplified CABAC encoder 200 implements the encoder 130. The simplified CABAC encoder 200 comprises a binarizer 210, a context modeler 220, and a coding engine 230.

The binarizer 210 receives symbols of syntax elements, applies a binarization scheme to the symbols to obtain bin strings, and provides the bin strings to the context modeler 220. The syntax elements describe how the decoder 180 can reconstruct videos. The syntax elements include, for instance, MVDs and related data.

The context modeler 220 receives the bin strings, compares bits in probability update windows of the bin strings to context models, and updates the context models based on the comparison. A probability update window, or simply a window, is a specified number of bits in a bin string. Each syntax element may have its own context model. For the comparison, the context modeler 220 compares what an old probability, $P^{old}$, predicts a predicted value of a bit should be to what the actual value of the bit is. The context modeler 220 updates $P^{old}$ to a new probability, $P^{new}$, after the comparison. If the predicted value and the actual value are different, then $P^{old}$ and $P^{new}$ are different; if the predicted value and the actual value are the same, then $P^{old}$ and $P^{new}$ are also the same. Together, $P^{old}$, $P^{new}$, and the rules for how to update $P^{old}$ to $P^{new}$ make up a context model. The context modeler 220 provides the bin strings and a final $P^{new}$ to the coding engine 230.

The coding engine 230 receives the bin strings and $P^{new}$ from the context modeler 220 and encodes the bits in the bin strings according to $P^{new}$ to obtain encoded bits. Finally, the coding engine 230 provides the encoded bits to the output interface 140 as a bitstream for transmission to the destination device 160 over the medium 150. The decoder 180 then decodes the bitstream in an opposite manner.

MCABAC uses two probability update windows instead of one. Specifically, $W_0$ is relatively shorter and used for quickly-changing data, and $W_1$ is relatively longer and used for slowly-changing data. $W_0$ is shorter than $W_1$. $W_0$ and $W_1$ are associated with their own probabilities, $P_0$ and $P_1$, respectively. $P_0$ and $P_1$ are represented as follows:

$$P_0^{new} = \begin{cases} P_0^{old} + [(2^k - P_0^{old}) \gg M_i] & \text{if input is } 1 \\ P_0^{old} - (P_0^{old} \gg M_i) & \text{if input is } 0 \end{cases} \quad (1)$$

$$P_1^{new} = \begin{cases} P_1^{old} + [(2^k - P_1^{old}) \gg 8] & \text{if input is } 1 \\ P_1^{old} - (P_1^{old} \gg 8) & \text{if input is } 0 \end{cases} \quad (2)$$

k is an encoder precision in bits; $\gg$ is a symbol indicating a multiplication of 2 to the power of a succeeding amount, in this case $2^{M_i}$ or $2^8$; $M_i$ is a length of $W_0$; and a length of $W_1$ is 8. $M_i$ is variable, so the encoder 130 encodes it in the bitstream. An overall probability, P, is equal to 1 and defined as follows:

$$P = \frac{P_0^{new} + P_1^{new}}{2} \quad (3)$$
$$P = 0.5 P_0^{new} + 0.5 P_1^{new}.$$

P is a normalized value. In equation (3), both $P_0^{new}$ and $P_1^{new}$ have a weight of 0.5. However, it may be desirable to model bin strings with more emphasis on $P_0^{new}$ or on $P_1^{new}$. Thus, it may be desirable to assign different weights, not necessarily 0.5, to $P_0^{new}$ and $P_1^{new}$. In addition, it may be desirable to adaptively change those weights.

Disclosed herein are embodiments for adaptive MCABAC. The embodiments provide for setting different lengths of $W_0$ and $W_1$; setting unequal weights for $P_0^{new}$ and $P_1^{new}$; and setting those weights differently for each context model, the same for sets of context models, or the same for all context models. The weights are predefined at an encoder and at a decoder, the encoder signals the weights, or both the encoder and the decoder derive the weights. While deriving the weights, the encoder and the decoder may adapt $P_0^{new}$ and $P_1^{new}$. The embodiments provide for the ability to model bin strings with more emphasis on $P_0^{new}$ or on $P_1^{new}$.

First, instead of the encoder 130 signaling $M_i$ for $W_0$ and instead of setting a length of $W_1$ to 8, a length $M_s$ for short $W_0$ and a length $M_l$ for long $W_1$ are set. Thus, equations (1) and (2) become the following:

$$P_0^{new} = \begin{cases} P_0^{old} + [(2^k - P_0^{old}) \gg M_s] & \text{if input is } 1 \\ P_0^{old} - (P_0^{old} \gg M_s) & \text{if input is } 0 \end{cases} \quad (4)$$

$$P_1^{new} = \begin{cases} P_1^{old} + [(2^k - P_1^{old}) \gg M_l] & \text{if input is } 1 \\ P_1^{old} - (P_1^{old} \gg M_l) & \text{if input is } 0 \end{cases} \quad (5)$$

For instance, $M_s$=4, and $M_l$=8.

Second, instead of setting an equal weight of 0.5 for both $P_0^{new}$ and $P_1^{new}$, unequal weights for $P_0^{new}$ and $P_1^{new}$ are set. Thus, equation (3) becomes the following:

$$P = \alpha_0 P_0^{new} + \alpha_1 P_1^{new}. \quad (6)$$

$\alpha_0$ is a weight for $P_0^{new}$, $\alpha_1$ is a weight for $P_1^{new}$, and $\alpha_0 \neq \alpha_1$. $\alpha_0$ and $\alpha_1$ are normalized values. When $\alpha_0 + \alpha_1 = 1$, equation (6) becomes the following:

$$P = \alpha_0 P_0^{new} + (1 - \alpha_0) P_1^{new}. \quad (7)$$

Alternatively, instead of equation (6), equation (3) becomes the following:

$$P = [\alpha_0 P_0^{new} + (2^N - \alpha_0) P_1^{new}] \gg N. \quad (8)$$

N is a predefined integer. For instance, N=3. In this context, predefined may mean that N is set before the encoder 130 encodes, or the decoder 180 decodes, a bitstream based on N. When $\alpha_0 > \alpha_1$, more emphasis is on $P_0^{new}$ instead of on $P_1^{new}$. Similarly, when $\alpha_1 > \alpha_0$, more emphasis is on $P_1^{new}$ instead of on $P_0^{new}$.

Third, $\alpha_0$ is different for each context model, and $\alpha_1$ is different for each context model. Alternatively, $\alpha_0$ is the same for a set of context models, and $\alpha_1$ is the same for a set of context models. Alternatively, $\alpha_0$ is the same for all context models, and $\alpha_1$ is the same for all context models. Alternatively, one technique is used for $\alpha_0$ and another technique is used for $\alpha_1$.

Fourth, $\alpha_0$ and $\alpha_1$ are determined using one of the following three approaches. By determining $\alpha_0$, $\alpha_1$ may also be determined when $\alpha_0 + \alpha_1 = 1$. Similarly, by determining $\alpha_1$, $\alpha_0$ may also be determined.

In a first approach for determining $\alpha_0$ and $\alpha_1$, $\alpha_0$ and $\alpha_1$ are predefined. In this context, predefined may mean that $\alpha_0$ and $\alpha_1$ are set before the encoder 130 encodes, and the decoder 180 decodes, a bitstream based on $\alpha_0$ and $\alpha_1$. For instance, $\alpha_0$ and $\alpha_1$ are set in a codec.

In a second approach for determining $\alpha_0$ and $\alpha_1$, the encoder 130 signals $\alpha_0$, $\alpha_1$, or both $\alpha_0$ and $\alpha_1$ in a bitstream. Though signaling of $\alpha_0$ is described, the encoder 130 may similarly encode $\alpha_1$ or both $\alpha_0$ and $\alpha_1$. The encoder 130 signals $\alpha_0$ using j bits, where j is an integer. For instance, when j=3, the encoder 130 signals $\alpha_0$ as follows:

TABLE 1

Values for $\alpha_0$.

| Code | 000 | 001 | 010 | 011 | 100 | 101 | 110 | 111 |
|---|---|---|---|---|---|---|---|---|
| Equal Distribution | 0 | 1/8 | 1/4 | 3/8 | 1/2 | 5/8 | 3/4 | 7/8 |
| Unequal Distribution | 0 | 1/32 | 1/16 | 1/4 | 1/2 | 5/8 | 3/4 | 7/8 |

Table 1 comprises both an equal distribution and an unequal distribution. The equal distribution comprises equally-spaced values for $\alpha_0$, and the unequal distribution comprises unequally-spaced values for $\alpha_0$. The encoder 130 and the decoder 180 may store Table 1, or the equal distribution portion or the unequal portion of Table 1, as a lookup table. As an example, if the encoder 130 signals 011 for $\alpha_0$, then the decoder 180 looks up 011 in its lookup table and determines that $\alpha_0$ is 3/8. The decoder 180 then subtracts 3/8 from 1 to determine that $\alpha_1$ is 5/8. J may be variable. The encoder signals $\alpha_0$, $\alpha_1$, or both $\alpha_0$ and $\alpha_1$ in an SPS, a PPS, a slice header, or another high-level NAL unit.

Figure 3A:
FIG. 3A is SPS syntax according to an embodiment of the disclosure
Figure 3B:
FIG. 3B is PPS syntax according to an embodiment of the disclosure.

FIG. 3A is SPS syntax 310 according to an embodiment of the disclosure. The SPS syntax 310 comprises a CABAC weights present flag, cabac_weights_present_flag, which indicates that a value of $\alpha_0$ should be initialized based on a predefined relationship. FIG. 3B is PPS syntax 320 according to an embodiment of the disclosure. The PPS syntax 320 comprises a CABAC weights present flag, cabac_weights_present_flag, which indicates that a value of $\alpha_0$ should be initialized based on a predefined relationship. Though the SPS syntax 310 and the PPS syntax 320 comprise cabac_weights_present_flag in the locations shown, the SPS syntax 310 and the PPS syntax 320 may comprise cabac_weights_present_flag in another suitable location. The predefined relationship may be a table such as Table 1 and may indicate a different value for each context model, a different value for each set of context models, or the same value for all context models. In this context, predefined may mean that $\alpha_0$ is set before the encoder 130 encodes, or the decoder 180 decodes, a bitstream based on $\alpha_0$. For instance, $\alpha_0$ may be hardcoded.

Figure 4A:
FIG. 4A is SPS syntax according to another embodiment of the disclosure
Figure 4B:
FIG. 4B is PPS syntax according to another embodiment of the disclosure.

FIG. 4A is SPS syntax 410 according to another embodiment of the disclosure. The SPS syntax 410 comprises a CABAC weights present flag, cabac_weights_present_flag, which indicates that a value of $\alpha_0$ should be initialized based on a predefined relationship. FIG. 4B is PPS syntax 420 according to an embodiment of the disclosure. The PPS syntax 420 comprises a CABAC weights present flag, cabac_weights_present_flag, which indicates that a value of $\alpha_0$ should be initialized based on a predefined relationship. Though the SPS syntax 410 and the PPS syntax 420 comprise cabac_weights_present_flag in the locations shown, the SPS syntax 410 and the PPS syntax 420 may comprise cabac_weights_present_flag in another suitable location. The predefined relationship may be a table such as Table 1 and may indicate a different value for each context model, a different value for each set of context models, or the same value for all context models. In this context, predefined may mean that $\alpha_0$ is set before the encoder 130 encodes, or the decoder 180 decodes, a bitstream based on $\alpha_0$. For instance, $\alpha_0$ may be hardcoded.

In a third approach for determining $\alpha_0$ and $\alpha_1$, both the encoder 130 and the decoder 180 derive $\alpha_0$. The encoder 130 and the decoder 180 may do so using the same method. Though derivation of $\alpha_0$ is described, the encoder 130 and the decoder 180 may similarly encode $\alpha_1$ or both $\alpha_0$ and $\alpha_1$.

Figure 5:
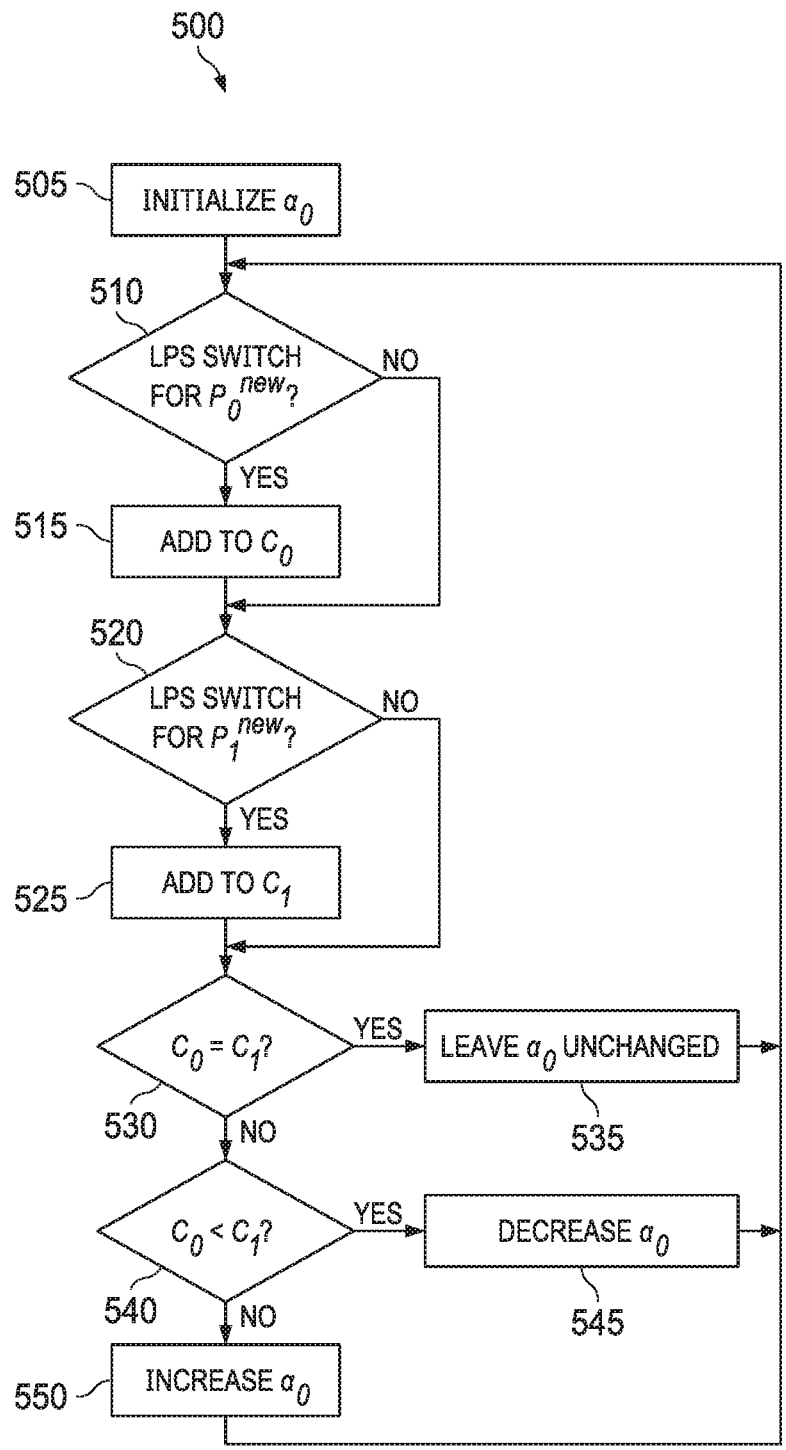
FIG. 5 is a flowchart illustrating a method of deriving a weight according to an embodiment of the disclosure.

FIG. 5 is a flowchart illustrating a method 500 of deriving a weight according to an embodiment of the disclosure. The encoder 130 or the decoder 180 performs the method 500. At step 505, the encoder 130 or the decoder 180 initializes $\alpha_0$. For instance, the encoder 130 or the decoder 180 initializes $\alpha_0$ at 0.5.

At decision diamond 510, the encoder 130 or the decoder 180 determines whether there is an LPS switch for $P_0^{new}$. For instance, if $P_0^{new}$ predicts a predicted value of a bit should be 0 so that an LPS for the bit is 1, meaning the predicted value is not 1, and if the actual value of the bit is 0, then the predicted value is correct, there is no LPS switch, and the method 500 proceeds to decision diamond 520. However, if $P_0^{new}$ predicts a predicted value of a bit should be 0 so that an LPS for the bit is 1, meaning the predicted value is not 1, and if the actual value of the bit is 1, then the predicted value is incorrect, there is an LPS switch, and the method 500 proceeds to step 515. At step 515, the encoder 130 or the decoder 180 adds to $C_0$, which is a counter for $\alpha_0$ and its corresponding probability $P_0^{new}$.

At decision diamond 520, the encoder 130 or the decoder 180 determines whether there is an LPS switch for $P_1^{new}$. For instance, if $P_1^{new}$ predicts a predicted value of a bit should be 0 so that an LPS for the bit is 1, meaning the predicted value is not 1, and if the actual value of the bit is 0, then the predicted value is correct, there is no LPS switch, and the method 500 proceeds to decision diamond 530. However, if $P_0^{new}$ predicts a predicted value of a bit should be 0 so that an LPS for the bit is 1, meaning the predicted value is not 1, and if the actual value of the bit is 1, then the predicted value is incorrect, there is an LPS switch, and the method 500 proceeds to step 525. At step 525, the encoder 130 or the decoder 180 adds to $C_1$, which is a counter for $\alpha_1$ and its corresponding probability $P_1^{new}$.

At decision diamond 530, the encoder 130 or the decoder 180 determines whether $C_0 = C_1$. If not, then the method 500 proceeds to decision diamond 540. If so, then the method proceeds to step 535. At step 535, the encoder 130 or the decoder 180 leaves $\alpha_0$ unchanged and returns to decision diamond 510 to analyze a subsequent bit.

At decision diamond 540, the encoder 130 or the decoder 180 determines whether $C_0 < C_1$. If not, then the method 500 proceeds to step 550. If so, then the method 500 proceeds to step 545. At step 545, the encoder 130 or the decoder 180 decreases $\alpha_0$ and returns to decision diamond 510 to analyze a subsequent bit. At step 550, the encoder 130 or the decoder 180 increases $\alpha_0$ and returns to decision diamond 510 to analyze a subsequent bit. The decrease at step 545 and the increase at step 550 are by a predefined increment, for instance 0.1. In this context, predefined means set before the encoder 130 or the decoder 180 performs the method 500.

The encoder 130 or the decoder 180 repeats the method 500 for each bit of a context entity such as a CU, a tile, a frame, or a GOP. By increasing or decreasing $\alpha_0$, $\alpha_1$, or both $\alpha_0$ and $\alpha_1$ while performing the method 600, the encoder 130 or the decoder 180 adapts $P_0^{new}$ and $P_1^{new}$.

Alternatively, instead of one of the three approaches above, the encoder 130 or the decoder 180 determines $\alpha_0$, $\alpha_1$, or both $\alpha_0$ and $\alpha_1$ with any suitable precision using a shallow neural network. The precision may be variable. Alternatively, the encoder 130 signals $\alpha_0$, $\alpha_1$, or both $\alpha_0$ and $\alpha_1$ using an on/off flag combined with any of the three approaches above. Alternatively, the encoder 130 or the decoder 180 determines statistical behavior and selects from a lookup table $\alpha_0$, $\alpha_1$, or both $\alpha_0$ and $\alpha_1$ corresponding to the statistical behavior.

Figure 6:
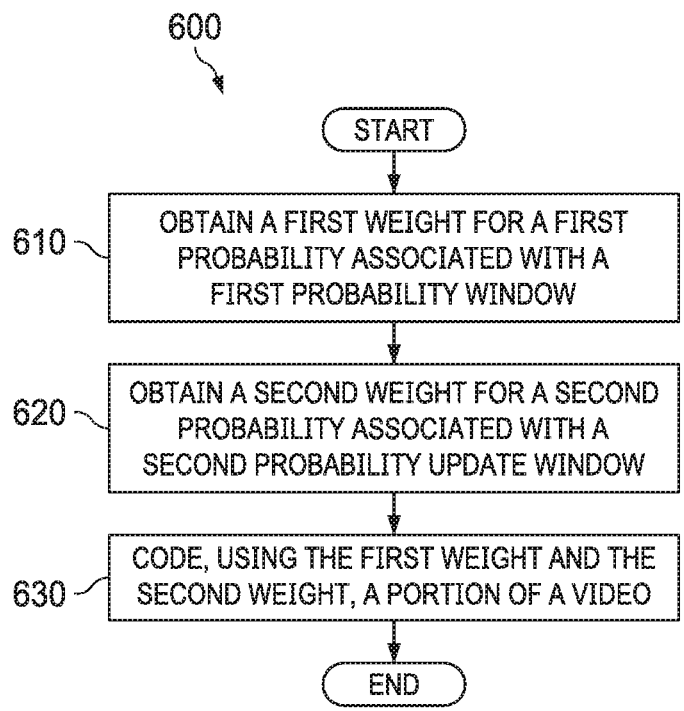
FIG. 6 is a flowchart illustrating a method of coding a portion of a video according to an embodiment of the disclosure.

FIG. 6 is a flowchart illustrating a method 600 of coding a portion of a video according to an embodiment of the disclosure. The encoder 130 or the decoder 180 performs the method 600. At step 610, a first weight for a first probability associated with a first probability update window is obtained. For instance, the encoder 130 or the decoder 180 obtains $\alpha_0$, $\alpha_0$ is for $P_0^{new}$, and $P_0^{new}$ is associated with K. At step 620, a second weight for a second probability associated with a second probability update window is obtained. For instance, the encoder 130 or the decoder 180 obtains $\alpha_1$, $\alpha_1$ is for $P_1^{new}$, and $P_1^{new}$ is associated with $W_1$. The first weight and the second weight are unequal. Finally, at step 630, a portion of a video is coded using the first weight and the second weight. For instance, the encoder 130 encodes, or the decoder 180 decodes, a bin string using equations (4)-(6).

In the method 600, an overall probability may be based on the first weight, the first probability, the second weight, and the second probability. For instance, the overall probability is as expressed in equation (6), (7), or (8). The overall probability may be equal to 1. The first weight may be $\alpha_0$, the first probability may be $P_0^{new}$, the second weight may be $\alpha_1$, and the second probability may be $P_1^{new}$. Specifically, the overall probability may be as expressed in equation (6). The first probability update window may be shorter than the second probability update window and used for quickly-changing data, and the second probability update window may be used for slowly-changing data. For instance, the first probability update window is $W_0$ and the second probability update window is $W_1$. At least one of the first weight or the second weight is predefined. A sum of the first weight and the second weight may be equal to 1.

When the coding in the method 600 is encoding, the method 600 may further comprise signaling at least one of the first weight or the second weight in a bitstream. The signaling may be based on an equal distribution. The signaling may be based on an unequal distribution. For instance, the signaling is based on either the equal distribution or the unequal distribution in Table 1. The signaling may be in a sequence parameter set. The signaling may be in a picture parameter set. The weights may be in a separate table. The method 600 may further comprise deriving at least one of the first weight and the second weight. For instance, the method 600 may further comprise the method 500. The deriving may be based on a first counter for the first probability, a second counter for the second probability, and a comparison of the first counter and the second counter. For instance, the first counter is $C_0$, the second counter is $C_1$, and the comparison is the decision diamond 530, the decision diamond 540, or both the decision diamond 530 and the decision diamond 540.

When the coding in the method 600 is decoding, the method 600 may further comprise receiving a code indicating at least one of the first weight or the second weight in a bitstream. For instance, the code is one of the codes in Table 1. The code may be based on an equal distribution. The code may be based on an unequal distribution. For instance, the code is based on either the equal distribution or the unequal distribution in Table 1. The code may be in a sequence parameter set. The code may be in a picture parameter set. The method 600 may further comprise deriving at least one of the first weight and the second weight. For instance, the method 600 may further comprise the method 500. The deriving is based on a first counter for the first probability, a second counter for the second probability, and a comparison of the first counter and the second counter. For instance, the first counter is $C_0$, the second counter is $C_1$, and the comparison is the decision diamond 530, the decision diamond 540, or both the decision diamond 530 and the decision diamond 540.

An apparatus comprising a memory and a processor coupled to the memory may perform the method 500. A computer program product comprising computer-executable instructions stored on a non-transitory medium that when executed by a processor may cause an apparatus to perform the method 500.

Figure 7:
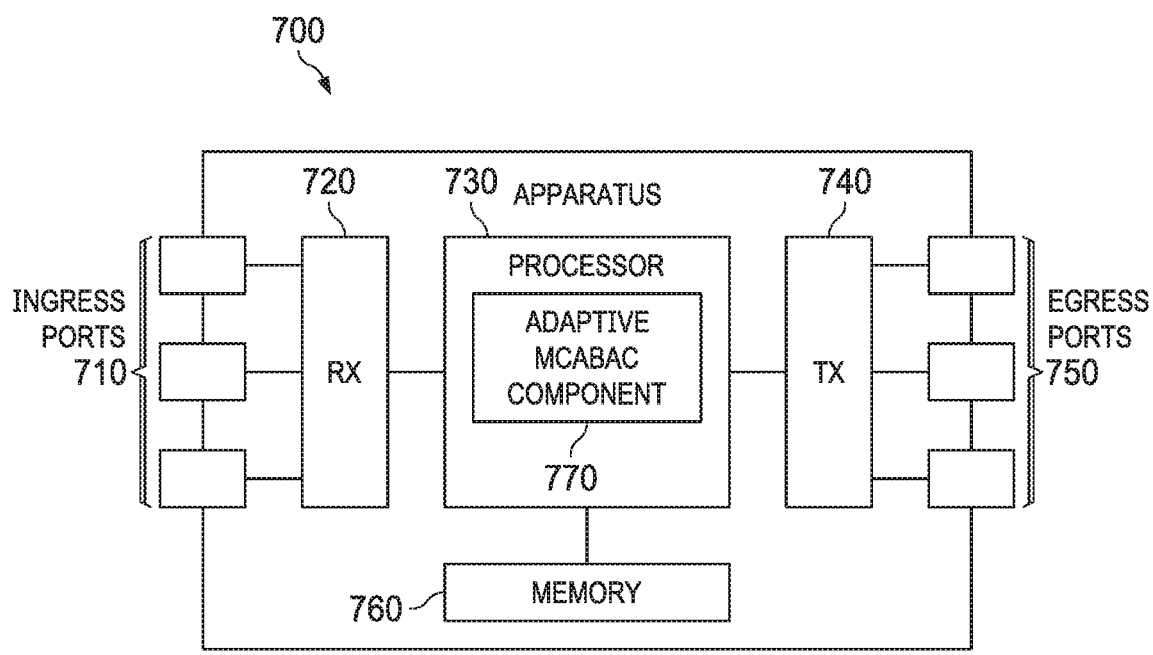
FIG. 7 is a schematic diagram of an apparatus according to an embodiment of the disclosure.

FIG. 7 is a schematic diagram of an apparatus 700 according to an embodiment of the disclosure. The apparatus 700 may implement the disclosed embodiments. The apparatus 700 comprises ingress ports 710 and an RX 720 to receive data; a processor, logic unit, baseband unit, or CPU 730 to process the data; a TX 740 and egress ports 750 to transmit the data; and a memory 760 to store the data. The apparatus 700 may also comprise OE components, EO components, or RF components coupled to the ingress ports 710, the RX 720, the TX 740, and the egress ports 750 to provide ingress or egress of optical signals, electrical signals, or RF signals.

The processor 730 is any combination of hardware, middleware, firmware, or software. The processor 730 comprises any combination of one or more CPU chips, cores, FPGAs, ASICs, or DSPs. The processor 730 communicates with the ingress ports 710, the RX 720, the TX 740, the egress ports 750, and the memory 760. The processor 730 comprises an adaptive MCABAC component 770, which implements the disclosed embodiments. The inclusion of the adaptive MCABAC component 770 therefore provides a substantial improvement to the functionality of the apparatus 700 and effects a transformation of the apparatus 700 to a different state. Alternatively, the memory 760 stores the motion adaptive MCABAC component 770 as instructions, and the processor 730 executes those instructions.

The memory 760 comprises any combination of disks, tape drives, or solid-state drives. The apparatus 700 may use the memory 760 as an over-flow data storage device to store programs when the apparatus 700 selects those programs for execution and to store instructions and data that the apparatus 700 reads during execution of those programs. The memory 760 may be volatile or non-volatile and may be any combination of ROM, RAM, TCAM, or SRAM.

An apparatus comprises a memory element; and a processor element coupled to the memory element and configured to perform the following method: obtaining a first weight for a first probability associated with a first probability update window; obtaining a second weight for a second probability associated with a second probability update window, wherein the first weight and the second weight are unequal; and coding, using the first weight and the second weight, a portion of a video.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method comprising:
   obtaining a first weight $\alpha_0$ for a first probability $P_0^{new}$ associated with a first probability update window $W_0$;
   obtaining a second weight $\alpha_1$ for a second probability $P_1^{new}$ associated with a second probability update window $W_1$, wherein $\alpha_0$ and $\alpha_1$ are non-binary and unequal, wherein $P_0^{new}$ and $P_1^{new}$ are based on a comparison of what an old probability predicts a predicted value of a bit should be to what an actual value of the bit is, and wherein $W_0$ and $W_1$ are specified numbers of bits in a bin string; and
   coding, using $\alpha_0$, $\alpha_1$, and multi-hypothesis context-adaptive binary arithmetic coding (MCABAC), a portion of a video.

2. The method of claim 1, wherein an overall probability is based on $\alpha_0$, $P_0^{new}$, $\alpha_1$ and $P_1^{new}$.

3. The method of claim 2, wherein $P=\alpha_0 P_0^{new}+\alpha_1 P_1^{new}$, wherein $P=1$, and wherein the overall probability is $P$.

4. The method of claim 1, wherein $W_0$ is shorter than $W_1$ and used for quickly-changing data, and wherein $W_1$ is used for slowly-changing data.

5. The method of claim 1, wherein at least one of $\alpha_0$ or $\alpha_1$ is predefined.

6. The method of claim 1, wherein a sum of $\alpha_0$ and $\alpha_1$ is 1.

7. The method of claim 1, wherein the coding is encoding.

8. The method of claim 7, further comprising signaling at least one of $\alpha_0$ or $\alpha_1$ in a bitstream.

9. The method of claim 8, wherein the signaling is based on an equal distribution.

10. The method of claim 8, wherein the signaling is based on an unequal distribution.

11. The method of claim 8, wherein the signaling is in a sequence parameter set or a picture parameter set.

12. The method of claim 7, further comprising deriving at least one of $\alpha_0$ or $\alpha_1$, wherein the deriving is based on a first counter for $P_0^{new}$, a second counter $P_1^{new}$, and a comparison of the first counter and the second counter.

13. The method of claim 1, wherein the coding is decoding.

14. The method of claim 13, further comprising receiving a code indicating at least one of $\alpha_0$ or $\alpha_1$ in a bitstream.

15. The method of claim 14, wherein the code is based on an equal distribution.

16. The method of claim 14, wherein the code is based on an unequal distribution.

17. The method of claim 14, wherein the code is in a sequence parameter set or a picture parameter set.

18. The method of claim 13, further comprising deriving at least one of $\alpha_0$ or $\alpha_1$, wherein the deriving is based on a first counter for $P_0^{new}$, a second counter for $P_1^{new}$, and a comparison of the first counter and the second counter.

19. An apparatus comprising:
    a memory configured to store instructions; and
    a processor coupled to the memory and configured to:
       obtain a weight $\alpha_0$ for a first probability $P_0^{new}$ associated with a first probability update window $W_0$;
       obtain a second weight $\alpha_1$ for a second probability $P_1^{new}$ associated with a second probability update window $W_1$, wherein $\alpha_0$ and $\alpha_1$ are non-binary and are unequal, wherein $P_0^{new}$ and $P_1^{new}$ are based on a comparison of what an old probability predicts a predicted value of a bit should be to what an actual value of the bit is, and wherein $W_0$ and $W_1$ are specified numbers of bits in a bin string; and
       code, using $\alpha_0$, $\alpha_1$, and multi-hypothesis context-adaptive binary arithmetic coding (MCABAC), a portion of a video.

20. A computer program product comprising instructions stored on a non-transitory medium and that, when executed by a processor, cause an apparatus to:
    obtain a first weight $\alpha_0$ for a first probability $P_0^{new}$ associated with a first probability update window $W_0$;
    obtain a second weight $\alpha_1$ for a second probability $P_1^{new}$ associated with a second probability update window $W_1$, wherein $\alpha_0$ and $\alpha_1$ are non-binary and unequal, wherein $P_0^{new}$ and $P_1^{new}$ are based on a comparison of what an old probability predicts a predicted value of a bit should be to what an actual value of the bit is, and wherein $W_0$ and $W_1$ are specified numbers of bits in a bin string; and
    code, using $\alpha_0$, $\alpha_1$, and multi-hypothesis context-adaptive binary arithmetic coding (MCABAC), a portion of a video.

21. The method of claim 1, further comprising adaptively changing $\alpha_0$ and $\alpha_1$.

22. The method of claim 1, further comprising:
    setting a first length $M_s$ for $W_0$; and
    setting a second length $M_l$ for $W_1$.

23. The method of claim 1, further comprising setting $\alpha_0$ and $\alpha_1$ differently for each context model.

24. The method of claim 1, further comprising setting $\alpha_0$ and $\alpha_1$ the same for each context model.

25. The method of claim 1, further comprising setting $\alpha_0$ and $\alpha_1$ the same for all context models.

26. The method of claim 1, further comprising further coding the portion using a context model specific to a syntax element to be coded.

* * * * *